US007062127B2

(12) United States Patent
Purchase et al.

(10) Patent No.: US 7,062,127 B2
(45) Date of Patent: *Jun. 13, 2006

(54) ATHERMAL AWG AND AWG WITH LOW POWER CONSUMPTION USING GROOVE OF CHANGEABLE WIDTH

(75) Inventors: Kenneth Purchase, Mountain View, CA (US); Robert Cole, Mt. Hamilton, CA (US); Anthony J. Ticknor, Cupertino, CA (US); Kenneth McGreer, Fremont, CA (US); Peter D. Ascanio, Fremont, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/844,778

(22) Filed: May 13, 2004

(65) Prior Publication Data
US 2004/0208417 A1    Oct. 21, 2004

Related U.S. Application Data

(63) Continuation of application No. 10/100,958, filed on Mar. 18, 2002, now Pat. No. 6,738,545.

(51) Int. Cl.
*G02B 6/34* (2006.01)
*G02B 6/35* (2006.01)
(52) U.S. Cl. .......................... 385/37; 385/14; 385/16; 385/24
(58) Field of Classification Search ............ 385/14–16, 385/18, 24, 37
See application file for complete search history.

(56) References Cited

U.S. PATENT DOCUMENTS

| | | | |
|---|---|---|---|
| 5,905,824 A | 5/1999 | Delisle et al. | |
| 6,087,280 A | 7/2000 | Beall et al. | |
| 6,118,909 A | 9/2000 | Chen et al. | |
| 6,137,939 A | 10/2000 | Henry et al. | |
| 6,169,838 B1 | 1/2001 | He et al. | |
| 6,201,918 B1 | 3/2001 | Berkley et al. | |
| 6,222,963 B1 | 4/2001 | Grand et al. | |
| 6,456,763 B1 | 9/2002 | Kashihara et al. | |
| 6,466,707 B1 | 10/2002 | Dawes et al. | |
| 6,490,395 B1 | 12/2002 | Nara et al. | |
| 6,603,892 B1 | 8/2003 | Ticknor | |
| 6,668,116 B1 * | 12/2003 | Nekado et al. | 385/37 |
| 6,738,545 B1 * | 5/2004 | Purchase et al. | 385/37 |
| 6,842,572 B1 * | 1/2005 | Johannessen | 385/50 |
| 2001/0033714 A1 * | 10/2001 | Delisle et al. | 385/33 |
| 2001/0033715 A1 | 10/2001 | Delisle et al. | |
| 2002/0097961 A1 * | 7/2002 | Kazarinov et al. | 385/37 |

OTHER PUBLICATIONS

Inoue, et al., Athermal Silica-Based Arrayed-Waveguide Grating (AWG) Multiplexer, 22-25 Sep. 1997, ECOC 97, Conference Publication No. 448, IEE, pp. 33-36, JAPAN.
International Search Report for PCT/US04/14084, Date of Mailing Mar. 4, 2005.

* cited by examiner

*Primary Examiner*—Michelle Connelly-Cushwa
(74) *Attorney, Agent, or Firm*—Amin & Turocy, LLP

(57) ABSTRACT

Optical integrated circuits are disclosed having a gap traversing the lens or the waveguide grating and an actuator that controllably positions the optical integrated circuit on each side of the gap. As a result, the thermal sensitivity of the optical integrated circuits, for example, arrayed waveguide gratings, is mitigated. Also disclosed are methods for fabricating optical integrated circuits employing the gap and actuator.

22 Claims, 5 Drawing Sheets

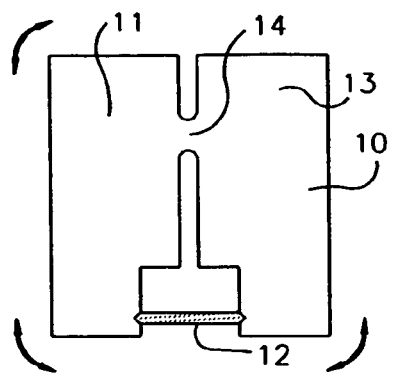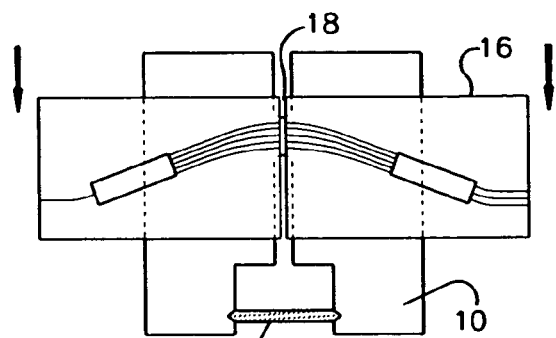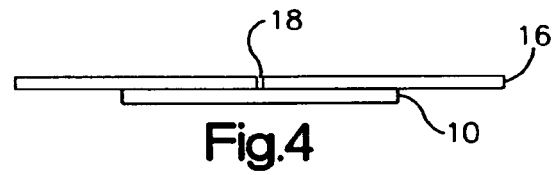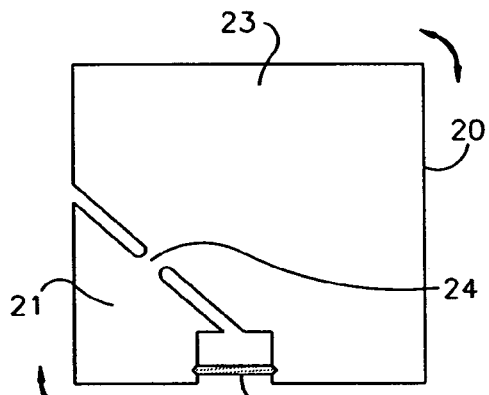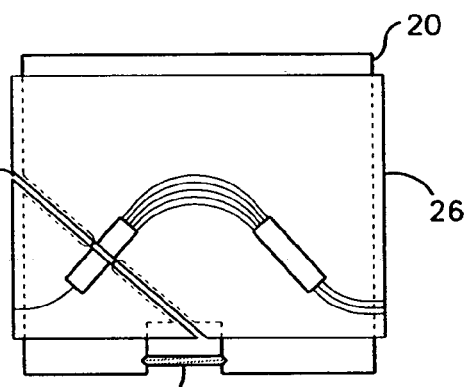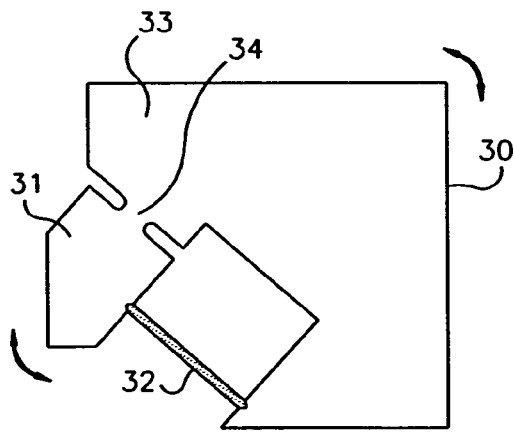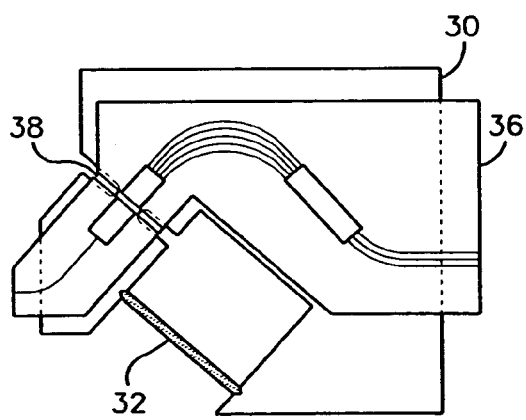

ATHERMAL AWG AND AWG WITH LOW POWER CONSUMPTION USING GROOVE OF CHANGEABLE WIDTH

This patent application is a continuation of application Ser. No. 10/100,958 filed on Mar. 18, 2002, now U.S. Pat. No. 6,738,545.

FIELD OF THE INVENTION

The present invention relates to the art of optical integrated circuits and more particularly to apparatus and methods for providing arrayed waveguides having a center wavelength that is independent of temperature.

BACKGROUND OF THE INVENTION

Optical integrated circuits (OICs) come in many forms such as 1×N optical splitters, optical switches, wavelength division multiplexers (WDMs), demultiplexers, optical add/drop multiplexers (OADMs), and the like. Such OICs are employed in constructing optical networks in which light signals are transmitted between optical devices for carrying data and other information. For instance, traditional signal exchanges within telecommunications networks and data communications networks using transmission of electrical signals via electrically conductive lines are being replaced with optical fibers and circuits through which optical (e.g., light) signals are transmitted. Such optical signals may carry data or other information through modulation techniques, for transmission of such information through an optical network. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs contain optical paths known as waveguides formed on a silicon wafer substrate using lithographic processing, wherein the waveguides are made from transmissive media, which have a higher index of refraction than the chip substrate or the outlying cladding layers in order to guide light along the optical path. By using advanced photolithographic and other processes, PLCs are fashioned to integrate multiple components and functionalities into a single optical chip.

One important application of PLCs in particular and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. For example, early systems provided four different wavelengths separated by 400 GHz, wherein each wavelength transferred data at 2.5 Gbits per second. Current multiplexed optical systems employ as many as 160 wavelengths on each optical fiber.

In order to provide advanced multiplexing and demultiplexing (e.g., DWDM) and other functions in such networks, arrayed-waveguide gratings (AWGs) have been developed in the form of PLCs. Existing AWGs can provide multiplexing or demultiplexing of up to 80 channels or wavelengths spaced as close as 50 GHz. As illustrated in FIG. 1, a conventional demultiplexing AWG 2 includes a single input port 3, and multiple output ports 4. Multiple wavelength light is received at the input port 3 (e.g., from an optical fiber in a network, not shown) and provided to an input lens 5 via an input optical path or waveguide 6.

The input lens 5 spreads the multiple wavelength light into an array of waveguides 7, sometimes referred to a waveguide grating. Each of the waveguides 7 has a different optical path length from the input lens 5 to an output lens 8, resulting in a different phase tilt at the input to the output lens 8 depending on wavelength. This phase tilt, in turn, affects how the light recombines in the output lens 8 through constructive interference. The output lens 8 thus provides different wavelengths at the output ports 4 via individual output waveguides 9, whereby the AWG 2 can be employed in demultiplexing light signals entering the input port 6 into two or more demultiplexed signals at the output port 4. The AWG 2 can alternatively be used to multiplex light signals from the ports 4 into a multiplexed signal having two or more wavelength components at the port 3.

One of the problems with optical integrated circuits, such as the conventional AWG 2 of FIG. 1 is temperature sensitivity. Since the waveguide material usually has a temperature dependent refractive index, the channel wavelengths of multi/demultiplexer shift as the temperature varies. This shift is typically of the order of 0.01 nm/E C in silica-based devices and 0.1 nm/E C in InP based devices. This wavelength shift can result in a loss of signal and/or cross talk in communication system(s) employing the AWG 2. As communication system(s) are designed with increasingly smaller channel spacing, even a small temperature dependent wavelength shift can have a significant effect on system performance. Presently, AWG=s must have active stabilization of the device operating temperature in order to perform acceptably. This stabilization is typically achieved by the addition of resistive heaters, temperature sensors, active electronics, and in some cases also thermo-electric coolers. Even though an AWG is a passive filter, currently it requires significant electronics and a few watts of power to operate effectively.

Accordingly, there remains a need for better solutions to temperature sensitivity in optical integrated circuits such as AWGs, which avoid or mitigate the performance reductions associated with conventional optical integrated circuits and provide for mitigation of active temperature stabilization and its associated costs.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides athermal optical integrated circuits and methods for athermalizing optical integrated circuits mitigating and/or overcoming the shortcomings associated with conventional optical integrated circuit(s) and other devices. The invention further comprises methods for fabricating OICs and for mitigating temperature sensitivity utilizing a groove and an actuator. Markedly lower power consumption also results from employing temperature responsive mechanical actuators in another aspect of the present invention.

According to an aspect of the present invention, an optical integrated circuit is provided that contains a base containing a first region and a second region separated by a hinge, and an AWG chip over the base, where a groove traverses one or more of one of the lenses and the waveguide grating, and an actuator connecting the first region and the second region of the base. The base and actuator have different thermal expansion coefficients. The actuator expands and/or contracts with temperature changes causing the first region and at least a portion of the AWG chip thereover to move with respect to the portion of the AWG chip over the second region. Thus, wavelength shift associated with waveguide temperature dependent refractive index can be mitigated.

According to another aspect of the present invention, optical integrated circuit is provided that contains an AWG chip with a groove traversing one or more of the lenses and the waveguide grating. The AWG chip contains a first region and a second region connected by a hinge and separated by the groove. An actuator connects the first region and the second region of the AWG chip. The AWG chip substrate and actuator have different thermal expansion coefficients. The actuator expands and/or contracts with temperature changes causing the first region of the AWG chip to move with respect to the second region. Thus, wavelength shift associated with waveguide temperature dependent refractive index can be mitigated.

Another aspect of the invention provides a methodology for fabricating an OIC capable of mitigating wavelength shift associated with waveguide temperature dependent refractive index. Fabrication of the OIC includes forming a groove in the AWG chip so that an actuator can induce relative movement between different portions of the chip in response to temperature changes.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF SUMMARY OF THE DRAWINGS

FIG. 2 is a schematic top plan view of a base or riser in accordance with one aspect of the present invention.

FIG. 3 is a schematic top plan view of an OIC in accordance with one aspect of the present invention.

FIG. 4 is a cross-sectional view of the OIC of FIG. 3.

FIG. 5 is a schematic top plan view of another base or riser in accordance with one aspect of the present invention.

FIG. 6 is a schematic top plan view of another OIC in accordance with one aspect of the present invention.

FIG. 7 is a schematic top plan view of yet another base or riser in accordance with one aspect of the present invention.

FIG. 8 is a schematic top plan view of yet another OIC in accordance with one aspect of the present invention.

DETAILED DESCRIPTION OF THE INVENTION

Figure 1:
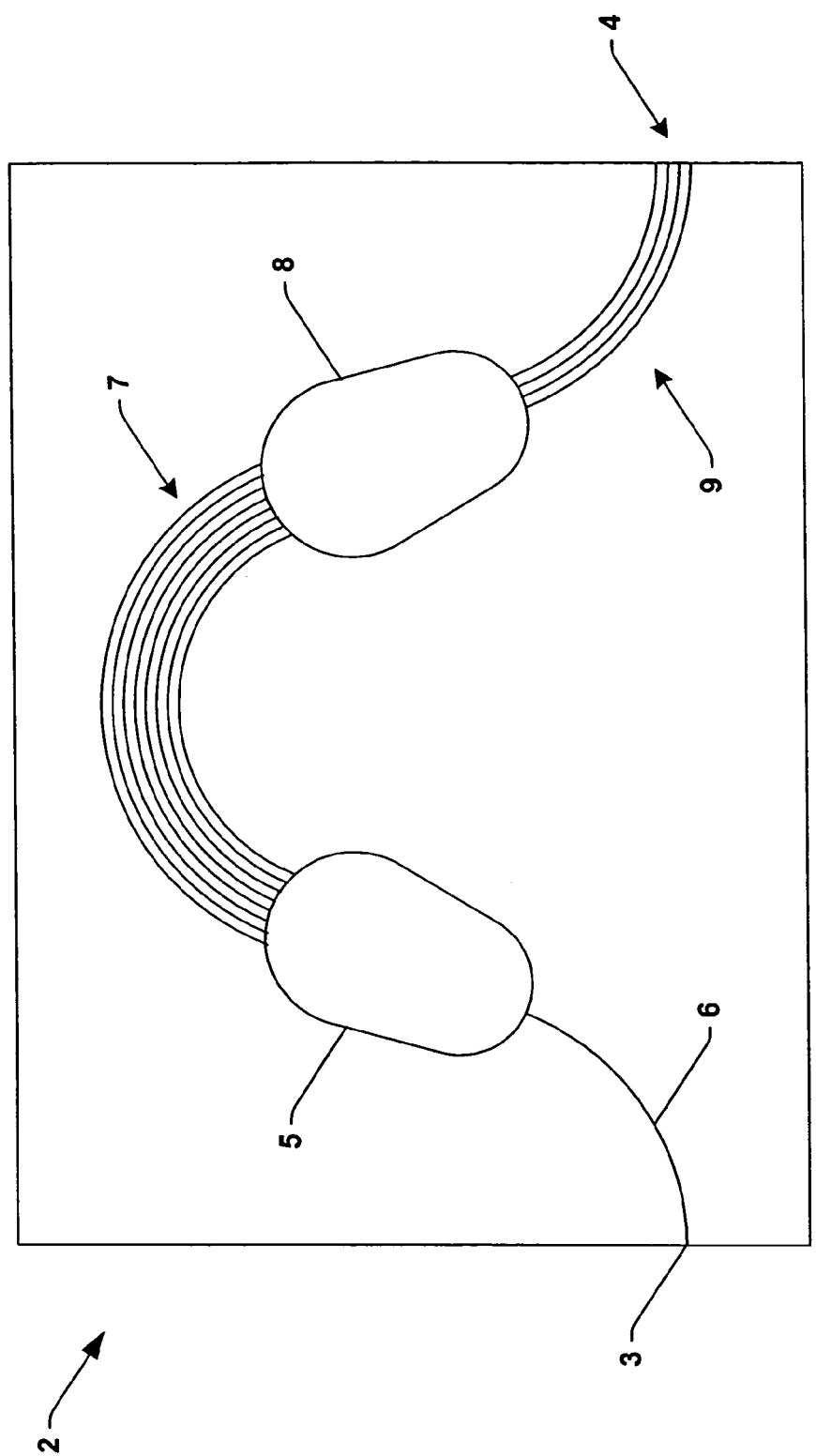
FIG. 1 is a schematic top plan view of a conventional AWG multiplexer/demultiplexer device.

The various aspects of the present invention will now be described with reference to the drawings, wherein like reference numerals are used to refer to like elements throughout. The invention provides for mitigation of temperature sensitivity of optical integrated circuits by employing mechanical beam steering.

The present invention provides athermal OICs and OICs with low power consumption by employing beam deflection, using an OIC or AWG having two or more distinct regions or pieces that can move relative to one another. This relative movement causes shifts in the center wavelength (CW), or wavelength of peak transmission for a given channel, of the OIC that are proportional to the motion of the two pieces. The OIC is designed such that the degree of CW change caused by the motion of the two pieces is equal in magnitude and opposite in sign to the CW change inherent in the OIC (as caused by expansion/contraction of the OIC and dependencies of waveguide refractive index upon temperature) then the device has approximately zero net dependence of CW upon temperature, having a center wavelength that is substantially independent of temperature, and is thus termed athermal.

As the temperature of an OIC increases or decreases, the index of refraction of one or more region waveguide(s) may change. In order to compensate for this temperature based index of refraction change, the actuator expands/contracts as a result of the temperature change, causing the edges of the AWG chip in the groove to move (eg., rotate). The movement (rotation) caused by temperature changes corresponds to or compensates for the temperature-change induced wavelength shifts in the waveguide(s) due to temperature dependent refractive index. As such, wavelength shift associated with waveguide temperature dependent refractive index change can be mitigated. Thus, loss of signal and/or cross talk in communication system(s) employing the OIC can be reduced.

Generally speaking, an AWG chip is positioned over a base. The base has a hinge separating and connecting a first region and a second region of the base. The hinge connects the first region and second region yet permits the first region and second region of the base to move relative to one another. Typically, the hinge is a relatively narrow strip of the base (or AWG substrate as described below). An actuator is connected to the first region and second region of the base, and expansion/contraction of the actuator may induce movement of the first and second regions about the hinge. The actuator and the base have different thermal expansion coefficients. A groove or gap is formed in the AWG chip in a position at least approximately over the hinge. One portion or piece of the AWG chip on one side of the groove is over and supported by the first region of the base while the other portion or piece of the AWG chip on the other side of the groove is over and supported by the second region of the base. Thus, movement of the first and second regions about the hinge induced by the expansion/contraction of the actuator causes the two portions or pieces of the AWG chip to move relative to one another.

Alternatively, the actuator connects the two portions or pieces of the AWG chip and expansion/contraction of the actuator may induce movement of the two portions or pieces of the AWG chip relative one another. The actuator and the AWG chip substrate have different thermal expansion coefficients. The base is constructed in such a manner so as to permit such movement between portions or pieces of the AWG chip (such as described above).

Still alternatively, the above described mechanism can be applied to a structure containing about half of the AWG chip, but equipped with a mirror. In such a structure, a groove is formed by positioning the waveguide grating or lens close to the mirror, but not directly affixed to the mirror (to permit movement). The actuator and the AWG chip/mirror substrate have different thermal expansion coefficients.

Although AWG chips containing an waveguide grating are discussed at length, the OIC may contain a Mach-Zehnder interferometer. In this case, the groove traverses the arms or waveguides of the Mach-Zehnder device.

The width of the groove in the AWG chip, or the width between the AWG chip and a mirror (hereinafter also referred to as a groove) is sufficient to permit movement so as to shift the CW. In one embodiment, the width of groove is about 1 micron or more and about 50 microns or less. In another embodiment, the width of groove is about 3 microns or more and about 30 microns or less. In yet another embodiment, the width of groove is about 5 microns or more and about 25 microns or less. In still yet another embodiment, the width of groove is about 7 microns or more and about 20 microns or less. The AWG chip may contain more than one groove. The groove or gap may be straight, curved, have a symmetric shape, or a asymmetric shape as it traverses the lens, waveguide grating, or is adjacent a mirror. In embodiments where the groove is asymmetric, the width of the groove as it traverses the lens or waveguide grating may vary yet remain within the width parameters described above. At widths over 50 microns, insertion loss concerns start to become significant.

The difference in thermal expansion coefficients between the actuator and the base, between the actuator and the AWG chip substrate, or between actuator and the AWG chip/mirror substrate is sufficient to induce relative movement of the two portions or pieces of the AWG chip by expansion/contraction of the actuator. In one embodiment, the difference in thermal expansion coefficients (for example, between the actuator and the base) is at least about 25%. In another embodiment, the difference in thermal expansion coefficients is at least about 100% (in other words the actuator can be at least twice the value of the base). In yet another embodiment, the difference in thermal expansion coefficients is at least about 200% (in other words the actuator can be at least three times the value of the base).

In one embodiment, an athermal OIC contains an AWG chip mounted over a base or a riser with hinge positioned under the waveguide grating, such as under the center portion of the waveguide grating. For example, referring to FIGS. 2 to 4, an example of such an OIC, and a method of fabricating the OIC, is shown.

Specifically referring to FIG. 2, a base 10, sometimes referred to as a riser, is provided. The base 10 is configured to contain a hinge 14 separating and connecting a first region 11 and a second region 13. The base is made of a material having a first thermal expansion coefficient. The base can be made of a metal, metal alloy, or hard plastic material. Examples of metals include one or more of aluminum, brass, bronze, chromium, copper, gold, iron, magnesium, nickel, palladium, platinum, silver, stainless steel, tin, titanium, tungsten, zinc, zirconium, Hastelloy®, Kovar®, Invar, Monel®, Inconel®, and the like.

An actuator 12 having a second thermal expansion coefficient, different from the first thermal expansion coefficient of the base 10 is provided connecting the first region 11 and the second region 13 of the base 10. The base can bend due to the hinge 14. That is, the first region 11 and the second region 13 may rotate about the hinge 14 consistent with the arrows.

The actuator 12 can be made of one or more of a metal such as aluminum, brass, bronze, chromium, copper, gold, iron, magnesium, nickel, palladium, platinum, silver, stainless steel, tin, titanium, tungsten, zinc, zirconium, Hastelloy®, Kovar®, Invar, Monel®, Inconel®, a ceramic material such as alumina or aluminum silicate, a polymeric material such as silicone rubber or an elastomer, polycarbonates, polyolefins, polyamides, polyesters, liquid crystal polymers, polymer composite materials (polymer combined with carbon fiber, graphite, or fiberglass), and the like. An example of a polymer composite is DuPont's Zytel® fiberglass reinforced Nylon. The actuator 12 may alternatively be a mechanical assembly containing a number of different materials designed to have, as a whole, a specific thermal expansion coefficient (different from that of the base 10).

The mechanical actuator 12 may alternatively be a piezoelectric element, an electrostrictive actuator, solenoid, electric motor such as a servo motor, linear motor, or stepper motor, or resistively heated thermal expanding member. When the actuator 12 is one of a piezoelectric element, solenoid, electric motor, or resistively heated thermal expanding member, one or more temperature sensors may be placed within the waveguide grating connected to a feedback loop that is connected to the actuator (a controller and/or processor may be also included in the feedback loop). Temperature changes detected by the sensor lead to a signal which is sent to the controller/processor that in turn leads to mechanical actuation of the actuator. In another embodiment, the actuator is described in U.S. Ser. No. 10/100,833 filed concurrently herewith entitled "Method and Apparatus Facilitating Mechanical Beam Steering for Optical Integrated Circuits" which incorporated herein by reference. In yet another embodiment, an actuator or block is described in co-pending U.S. Ser. No. 09/999,692 filed Oct. 24, 2001, now U.S. Pat. No. 6,603,892, entitled "Mechanical Beam Steering for Optical Integrated Circuits" along with related concepts, which is incorporated herein by reference.

Referring to FIG. 3, an AWG chip 16 is affixed to the base 10 by any suitable means. For example, an adhesive such as an UV curable adhesive can be positioned between the AWG chip 16 and the base 10. The AWG chip 16 is shown having a substrate, an input waveguide, a first lens, a second lens, a waveguide grating between the two lenses containing a plurality of waveguides, and output waveguides. The substrate of the AWG chip 16 can be made of one or more of silica, silicon, InP, GaAs, and the like. The input waveguide, the waveguide grating, and the output waveguide can be independently made of one or more of lithium niobate (LiNbO3) or other inorganic crystals, doped silica, undoped silica, glass, thermo-optic polymers, electro-optic polymers, and semiconductors such as indium phosphide (InP). Cladding layers may surround the various waveguides. It is noted that the actuator 12 may be attached to the base 10 before or after the AWG chip 16 is affixed to the base 10. Although not shown, the AWG chip 16 and/or base 10 can be cut to minimize the length of the groove 18; that is, to greatly increase the width of groove in locations where it does not traverse the waveguide grating (or lens as described below).

In this embodiment, the AWG chip 16 is positioned over the base so that the waveguide grating is directly above the hinge 14 of the base 10. A gap or groove 18 is formed in the AWG chip 16 traversing the waveguide grating. The groove 18 goes all the way through the AWG chip 16 vertically, and may or may not divide the AWG chip 16 into two distinct pieces. The AWG chip is diced in any suitable manner including using a dicing saw, water jet cutting, chemical etching, laser-wafer-cutter, wire-saw, EDM, and the like. One portion of the AWG chip 16 on one side of the groove 18 is supported by the first region 11 of the base 10 while another portion of the AWG chip 16 on the other side of the groove 18 is supported by the second region 13 of the base 10.

Referring to FIG. 4, a side view of the structure of FIG. 3 is shown along the arrows in FIG. 3. The gap 18 is completely through the AWG chip 16 in a vertical orientation. The gap 18 is located at or near the center of the grating, or at or near a perpendicular angle to the waveguides of the grating. Although the interior edges of the AWG chip 16 within the groove 18 are shown as perpendicular to the surface of base 10, the groove 18 may optionally be formed so that it is at a small angle to a line normal to the base surface in order to mitigate back reflection of light as the light crosses the groove 18. For example, the groove 18 may be formed at an angle of about 5° or more and about 15° or less to a line normal to the base surface.

Within the gap or groove 18, a waveplate (not shown), such as a half waveplate, may be optionally formed. Additionally or alternatively, the gap or groove 18 may filled with an adhesive, gel, polymer or liquid having an index of refraction that substantially matches that of the waveguides of the waveguide grating. The effect depends only weakly on the refractive index of the index matching substance, so that tight control of the substance's refractive index is not necessary. Still alternatively, the interior facing edges of the AWG chip 16 (in the groove 18) can be coated with an antireflection film and remain exposed to air.

As the temperature of the structure changes, the actuator 12 changes length at a different rate than the base 10, due to differences in the coefficients of thermal expansion. This causes a change in the angle between the two regions of the AWG (on either side of the groove 18), and causes a different phase delay for different waveguides in the waveguide grating, and thus causes a shift in the CW of the device. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

In another embodiment, an athermal OIC contains an AWG chip mounted over a base or a riser with hinge positioned under one of the lenses. For example, referring to FIGS. 5 to 8, examples of such OICs, and methods of fabricating the OICs, are shown.

Specifically referring to FIG. 5, a base 20 is provided. The base 20 is configured to contain a hinge 24 separating and connecting a first region 21 and a second region 23. The base is made of a material having a first thermal expansion coefficient. An actuator 22 having a second thermal expansion coefficient, different from the first thermal expansion coefficient of the base 20 is provided connecting the first region 21 and the second region 23 of the base 20. The base can bend due to the hinge 24. That is, the first region 21 and the second region 23 may rotate about the hinge 24 consistent with the arrows.

Referring to FIG. 6, an AWG chip 26 is affixed to the base 20 by any suitable means. For example, an adhesive can be positioned between the AWG chip 26 and the base 20. The AWG chip 26 is shown having a substrate, an input waveguide, a first lens, a second lens, a waveguide grating between the two lenses containing a plurality of waveguides, and output waveguides. The base 20, substrate, actuator 22, and waveguides can be made of any of the materials for these features described in connection with FIGS. 2 and 3. It is noted that the actuator 22 may be attached to the base 20 before or after the AWG chip 26 is affixed to the base 20.

In this embodiment, the AWG chip 26 is positioned over the base so that one of the lenses is directly above the hinge 24 of the base 20. A gap or groove 28 is formed in the AWG chip 26 traversing the lens. The groove 28 may be formed in the middle of the lens, near the input/output waveguides side of the lens, or near the waveguide grating side of the lens. The groove 28 goes all the way through the AWG chip 26 vertically, and may or may not divide the AWG chip 26 into two distinct pieces. The groove is formed in any suitable manner including using a dicing saw, water jet cutting, chemical etching, laser-wafer-cutter, wire-saw, EDM, and the like. One portion of the AWG chip 26 on one side of the groove 28 is supported by the first region 21 of the base 20 while another portion of the AWG chip 26 (containing the waveguide grating) on the other side of the groove 28 is supported by the second region 23 of the base 20.

The gap or groove 28 may be optionally filled with an adhesive, gel, polymer or liquid having an index of refraction that substantially matches that of the lens. The effect depends only weakly on the refractive index of the index matching substance, so that tight control of the substance's refractive index is not necessary. Alternatively, the interior facing edges of the AWG chip 26 (in the groove 28) can be optionally coated with an antireflection film and remain exposed to air.

As the temperature of the structure changes, the actuator 22 changes length at a different rate than the base 20, due to differences in the coefficients of thermal expansion. This causes a change in the angle between the two regions of the AWG (on either side of the groove 28), in particular between two regions of the lens traversed by the groove 28, and deflection of part of the lens and the input (our output) waveguide to move the waveguide relative to the focus point of the light, thus shifting which wavelengths are focused into the waveguide grating, and thus causes a shift in the CW of the device. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

Specifically referring to FIG. 7, a base 30 is provided. The base 30 is configured to contain a hinge 34 separating and connecting a first region 31 and a second region 33. The base is made of a material having a first thermal expansion coefficient. An actuator 32 having a second thermal expansion coefficient, different from the first thermal expansion coefficient of the base 30 is provided connecting the first region 31 and the second region 33 of the base 30. The base can bend due to the hinge 34. That is, the first region 31 and the second region 33 may rotate about the hinge 34 consistent with the arrows. In this embodiment, the shape of the base 30 is tailored to the shape of the AWG chip 36 described below.

Referring to FIG. 8, an AWG chip 36 is affixed to the base 30 by any suitable means. For example, an adhesive can be positioned between the AWG chip 36 and the base 30. The AWG chip 36 is tailored to the arrayed waveguide grating thereon. The AWG chip 36 is shown having a substrate, an input waveguide, a first lens, a second lens, a waveguide grating between the two lenses containing a plurality of waveguides, and output waveguides. The base 30, substrate, actuator 32, and waveguides can be made of any of the materials for these features described in connection with FIGS. 2 and 3. It is noted that the actuator 32 may be attached to the base 30 before or after the AWG chip 36 is affixed to the base 30.

In this embodiment, the AWG chip 36 is positioned over the base so that one of the lenses is directly above the hinge 34 of the base 30. A gap or groove 38 is formed in the AWG chip 36 traversing the lens. The groove 38 goes all the way through the AWG chip 36 vertically, and may or may not divide the AWG chip 36 into two distinct pieces. The groove is formed in any suitable manner including using a dicing saw, water jet cutting, chemical etching, laser-wafer-cutter, wire-saw, EDM, and the like. One portion of the AWG chip 36 on one side of the groove 38 is supported by the first region 31 of the base 30 while another portion of the AWG chip 36 (containing the waveguide grating) on the other side of the groove 38 is supported by the second region 33 of the base 30. The shape of the AWG chip 36 may be tailored so that substrate that is not near any one of the input/output waveguides, lenses, waveguide grating is eliminated, and/or so as to allow proper space for the installation of the actuator. Notches, bosses, and the like can be formed to facilitate attachment of the actuator. For example, AWG chip 36 of FIG. 8 has a tailored shape whereas AWG chip 26 of FIG. 6 does not.

The gap or groove 38 may be optionally filled with an adhesive, gel, polymer or liquid having an index of refraction that substantially matches that of the lens. The effect depends only weakly on the refractive index of the index matching substance, so that tight control of the substance's refractive index is not necessary. Alternatively, the interior facing edges of the AWG chip 36 (in the groove 38) can be optionally coated with an antireflection film and remain exposed to air.

As the temperature of the structure changes, the actuator 32 changes length at a different rate than the base 30, due to differences in the coefficients of thermal expansion. This causes a change in the angle between the two regions of the AWG (on either side of the groove 38), in particular between two regions of the lens traversed by the groove 38, and deflection of part of the lens and the input (our output) waveguide to move the waveguide relative to the focus point of the light, thus shifting which wavelengths are focused into the waveguide grating, and thus causes a shift in the CW of the device. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

In yet another embodiment, an athermal OIC contains an AWG chip mounted over a base or a riser with hinge positioned under the waveguide grating and a mirror. For example, referring to FIGS. 9 and 10, an example of such an OIC, and a method of fabricating the OIC, is shown.

Figure 9:
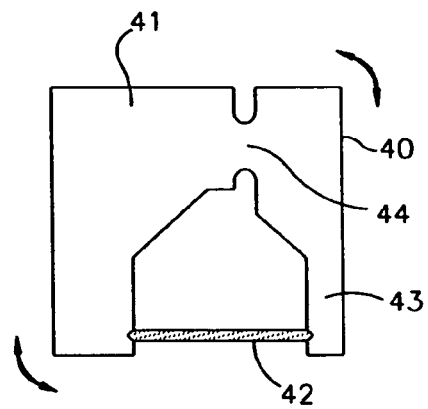
FIG. 9 is a schematic top plan view of still yet another base or riser in accordance with one aspect of the present invention.

Specifically referring to FIG. 9, a base 40 is provided. The base 40 is configured to contain a hinge 44 separating and connecting a first region 41 and a second region 43. An actuator 42 having a second thermal expansion coefficient, different from the first thermal expansion coefficient of the base 40 is provided connecting the first region 41 and the second region 43 of the base 40. The base can bend due to the hinge 44. That is, the first region 41 and the second region 43 may rotate about the hinge 44 consistent with the arrows.

Figure 10:
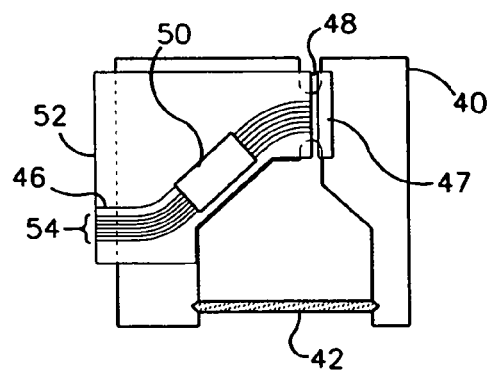
FIG. 10 is a schematic top plan view of still yet another OIC in accordance with one aspect of the present invention.

Referring to FIG. 10, an AWG chip 52 and a mirror 47 are affixed to the base 40 by any suitable means. For example, an adhesive can be positioned between the AWG chip 52 or mirror 47 and the base 40. The AWG chip 52 is shown having a substrate, an input waveguide 46, a lens 50, a waveguide grating between the lens and the mirror 47 containing a plurality of waveguides, and output waveguides 54. The base 40, substrate, actuator 42, and waveguides can be made of any of the materials for these features described in connection with FIGS. 2 and 3. The AWG chip 52 and mirror 47 are positioned so that a groove or gap 48 exists therebetween. The mirror 47 functions to reflect back light from the waveguide grating into the waveguide grating. It is noted that the actuator 42 may be attached to the base 40 before or after the AWG chip 52 is affixed to the base 40.

In this embodiment, the AWG chip 52 and mirror 47 are positioned over the base 40 so that the waveguide grating and mirror 47 are directly above the hinge 44 of the base 40. A gap or groove 48 traverses the waveguide grating. The groove 48 completely separates the AWG chip 52 from the mirror 47. The AWG chip 52 is on one side of the groove 48 and is supported by the first region 41 of the base 40 while the mirror 47 is on the other side of the groove 48 and is supported by the second region 43 of the base 40.

Within the gap or groove 48, a waveplate (not shown), such as a quarter waveplate, may be optionally formed. Additionally or alternatively, the gap or groove 48 may filled with an adhesive, gel, polymer or liquid having an index of refraction that substantially matches that of the waveguides of the waveguide grating. The effect depends only weakly on the refractive index of the index matching substance, so that tight control of the substance's refractive index is not necessary. Still alternatively, the interior facing edge of the AWG chip 46 (in the groove 48) can be polished or coated with an antireflection film and remain exposed to air.

As the temperature of the structure changes, the actuator 42 changes length at a different rate than the base 40, due to differences in the coefficients of thermal expansion. This causes a change in the angle between the AWG and the mirror 47, and causes a different phase delay for different waveguides in the waveguide grating, and thus causes a shift in the CW of the device. In particular, the angle at which the mirror is attached is used to select the AWG CW, and the degree of rotation of the mirror provided by the actuator as a function of temperature is used to cancel the AWG=s thermal response. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

In still yet another embodiment, an athermal OIC contains an AWG chip mounted over a base or a riser with hinge positioned under a lens and a mirror. For example, referring to FIGS. 11 and 12, an example of such an OIC, and a method of fabricating the OIC, is shown.

Figure 11:
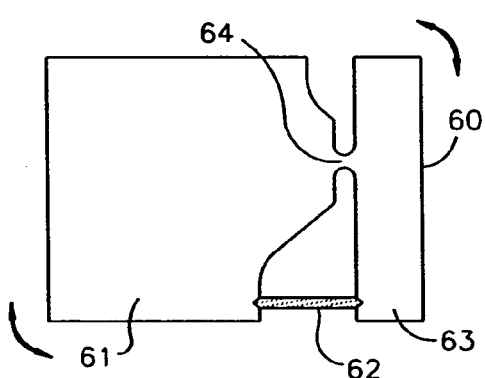
FIG. 11 is a schematic top plan view of another base or riser in accordance with one aspect of the present invention.

Specifically referring to FIG. 11, a base 60 is provided. The base 60 is configured to contain a hinge 64 separating and connecting a first region 61 and a second region 63. An actuator 62 having a second thermal expansion coefficient, different from the first thermal expansion coefficient of the base 60 is provided connecting the first region 61 and the second region 63 of the base 60. The base can bend due to the hinge 64. That is, the first region 61 and the second region 63 may rotate about the hinge 64 consistent with the arrows.

Figure 12:
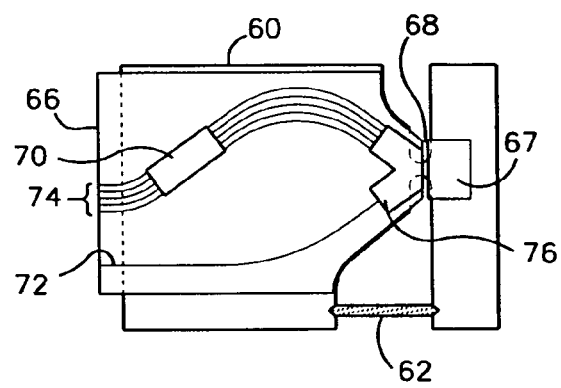
FIG. 12 is a schematic top plan view of another OIC in accordance with one aspect of the present invention.

Referring to FIG. 12, an AWG chip 66 and a mirror 67 are affixed to the base 60 by any suitable means. For example, an adhesive can be positioned between the AWG chip 66 or mirror 67 and the base 60. The AWG chip 66 is shown having a substrate, an input waveguide 72, a first lens 70, a second lens 76 that is folded, a waveguide grating between the first lens 70 and the folded lens 76 containing a plurality of waveguides, and output waveguides 74. The base 60, substrate, actuator 62, and waveguides can be made of any of the materials for these features described in connection with FIGS. 2 and 3. The AWG chip 66 and mirror 67 are positioned so that a groove or gap 68 exists therebetween. The mirror 67 functions to reflect back light from the folded lens 76 into the folded lens 76 so that it may enter the waveguide grating. It is noted that the actuator 62 may be attached to the base 60 before or after the AWG chip 66 is affixed to the base 60.

In this embodiment, the AWG chip 66 and mirror 67 are positioned over the base 60 so that the folded lens 76 and mirror 67 are directly above the hinge 64 of the base 60. A gap or groove 68 traverses the lens 76. The groove 68 completely separates the AWG chip 66 from the mirror 67. The AWG chip 66 is on one side of the groove 68 and is supported by the first region 61 of the base 60 while the mirror 67 is on the other side of the groove 68 and is supported by the second region 63 of the base 60.

The gap or groove 68 may be optionally polished, and optionally filled with an adhesive, gel, polymer or liquid having an index of refraction that substantially matches that of the waveguides of the waveguide grating. The effect depends only weakly on the refractive index of the index matching substance, so that tight control of the substance's refractive index is not necessary. Alternatively, the interior facing edge of the AWG chip 66 (in the groove 68) can be optionally coated with an antireflection film and remain exposed to air.

As the temperature of the structure changes, the actuator 62 changes length at a different rate than the base 60, due to differences in the coefficients of thermal expansion. This causes a change in the angle between the lens 76 and the mirror 67, and deflection of part of the lens and the input (our output) waveguide to move the waveguide relative to the focus point of the light, thus shifting which wavelengths are focused into the waveguide grating, and thus causing a shift in the CW of the device. In particular, the angle at which the mirror is attached is used to select the AWG CW, and the degree of rotation of the mirror provided by the actuator as a function of temperature is used to cancel the AWG=s thermal response. The actuator and base material size and shape are chosen such that the CW shift caused by the thermal expansion/contraction of the actuator exactly balances the CW shift in the AWG due to change in temperature. As a result, the AWG CW is independent of temperature.

Figure 13:
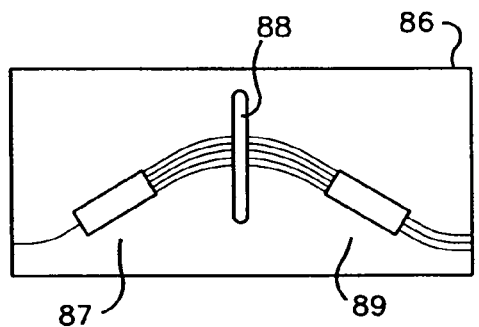
FIG. 13 is a schematic top plan view of an AWG chip in accordance with one aspect of the present invention.

The groove or gap may be formed in the AWG chip before or after mounting the AWG chip on the base. Referring to FIG. 13, an AWG chip 86 suitable for mounting on the base of FIG. 2 is shown. The AWG chip 86 is shown having a substrate, an input waveguide, a first lens, a second lens, a waveguide grating between the two lenses containing a plurality of waveguides, and output waveguides. A gap or groove 88 is formed in the AWG chip 86 traversing the waveguide grating, but not the entire chip. The AWG chip 86 is positioned over the base so that the waveguide grating is directly above the hinge 14 (referring to FIG. 2) of the base 10. If not already formed, a gap or groove 88 is formed in the AWG chip 86 traversing the waveguide grating, but not the entire chip. The groove 88 goes all the way through the AWG chip 86 vertically, but does not divide the AWG chip 86 into two distinct pieces. The groove 88 is formed in any suitable manner including wet etching or RIE. One portion 87 of the AWG chip 86 on one side of the groove 88 is supported by the first region 11 of the base 10 while another portion 89 of the AWG chip 86 on the other side of the groove 88 is supported by the second region 13 of the base 10.

The AWG chip 86 and base (underneath the chip) are then simultaneously cut in any suitable manner, such as using a waterjet, wire saw, laser, and the like, to provide a structure similar to FIG. 3 except that the AWG chip 86 substantially superimposes the base. The cutting tailors the shape of the structure around the functional features of the AWG chip 86 and in particular near the groove 88 so that the groove 88 separates the AWG chip 86 into two distinct pieces and the portions of the AWG chip 86 above and below the groove 88 no longer hold the chip in a single piece. An actuator is then added connecting the two regions of the base or two pieces of the chip.

Within the gap or groove 88, a waveplate (not shown), such as a half waveplate, may be optionally formed. Additionally or alternatively, the gap or groove 88 may filled with an adhesive, gel, polymer or liquid having an index of refraction that substantially matches that of the waveguides of the waveguide grating.

Figure 14:
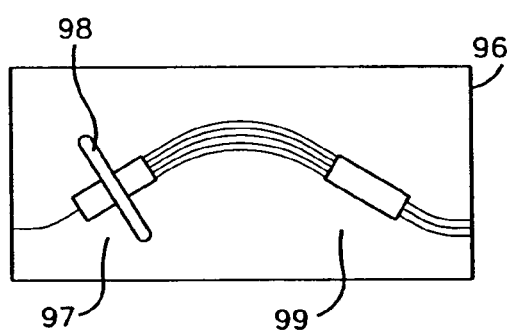
FIG. 14 is a schematic top plan view of another AWG chip in accordance with one aspect of the present invention.

Referring to FIG. 14, an AWG chip 96 suitable for mounting on the base of FIG. 7 is shown. The AWG chip 96 is shown having a substrate, an input waveguide, a first lens, a second lens, a waveguide grating between the two lenses containing a plurality of waveguides, and output waveguides.

In this embodiment, the AWG chip 96 is positioned over the base so that one of the lenses is directly above the hinge 24 of the base 20 (referring to FIG. 5). A gap or groove 98 is formed in the AWG chip 96 traversing the lens before or after attaching the chip to the base. The groove 98 goes all the way through the AWG chip 96 vertically, but does not divide the AWG chip 96 into two distinct pieces. The groove 98 is formed in any suitable manner. One portion 97 of the AWG chip 96 on one side of the groove 98 is supported by the first region 21 of the base 20 while another portion 99 of the AWG chip 96 (containing the waveguide grating) on the other side of the groove 98 is supported by the second region 23 of the base 20.

The AWG chip 96 and base (underneath the chip) are then simultaneously cut in any suitable manner, such as using a waterjet, wire saw, laser, and the like, to provide a structure similar to FIG. 8 except that the AWG chip 96 substantially superimposes the base. The cutting tailors the shape of the structure around the functional features of the AWG chip 96 and in particular near the groove 98 so that the groove 88 separates the AWG chip 96 into two distinct pieces and the portions of the AWG chip 96 above and below the groove 88 no longer hold the chip in a single piece. An actuator is then added connecting the two regions of the base or two pieces of the chip.

The gap or groove 98 may filled with an adhesive, gel, polymer or liquid having an index of refraction that substantially matches that of the lens. Alternatively, the interior facing edges of the AWG chip 96 (in the groove 98) can be coated with an antireflection film and remain exposed to air.

Although FIGS. 2 to 8 show AWG chips with a groove that completely separates the AWG chip into two pieces, the groove may alternatively separate the AWG chip into two regions. In another general embodiment, an AWG chip may be provided with a hinge, a gap or groove forming two regions in the AWG chip, and an actuator connecting the two regions of the AWG chip separated and connected by the hinge, and optionally affixed to a conventional base or a base as described in one or more of FIGS. 2, 5, 7, 9, and 11. If a base is employed, the base must allow for movement of the AWG chip induced by the actuator about the hinge. Since the OIC chip is not in two distinct pieces, a base is not necessary.

Figure 15:
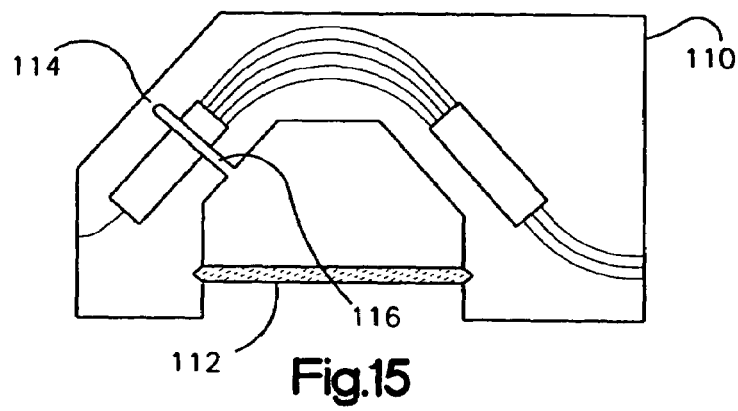
FIG. 15 is a schematic top plan view of an OIC in accordance with one aspect of the present invention.

Referring to FIG. 15, an AWG chip 110 is shown having a substrate, an input waveguide, a first lens, a second lens, a waveguide grating between the two lenses containing a plurality of waveguides, and output waveguides. An actuator 112 connects two regions of the chip, divided by a groove 116. The AWG chip 110 contains a hinge 114. The substrate, actuator 112, and waveguides can be made of any of the materials for these features described in connection with FIGS. 2 and 3.

The gap or groove 116 is formed in the AWG chip 110 traversing one or more of the lenses. The groove 116 goes all the way through the AWG chip 110 vertically. The groove 116 is formed in any suitable manner including using a dicing saw, water jet cutting, chemical etching, laser-wafer-cutter, wire-saw, EDM, and the like. In this embodiment, chemical etching such as reactive ion etching (RIE) is preferred. Although not shown, the groove 116 may traverse the waveguide grating instead of the lens, and the hinge 114 would be positioned visually above the waveguide grating.

Within the gap or groove 116, a waveplate (not shown), such as a half waveplate, may be optionally formed, particularly when the groove traverses the waveguide grating. Additionally or alternatively, the gap or groove 116 may filled with an adhesive, gel, polymer or liquid having an index of refraction that substantially matches that of the lens. Still alternatively, the interior facing edges of the AWG chip 110 (in the groove 116) can be coated with an antireflection film and remain exposed to air.

As the temperature of the structure changes, the actuator 112 changes length at a different rate than the substrate of the AWG chip 110, due to differences in the coefficients of thermal expansion. This causes a change in the angle between the two regions of the AWG (on either side of the groove 116), in particular between two regions of the lens traversed by the groove 116, and deflection of part of the lens and the input (our output) waveguide to move the waveguide relative to the focus point of the light, thus shifting which wavelengths are focused into the waveguide grating, and thus causes a shift in the CW of the device. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

Figure 16:
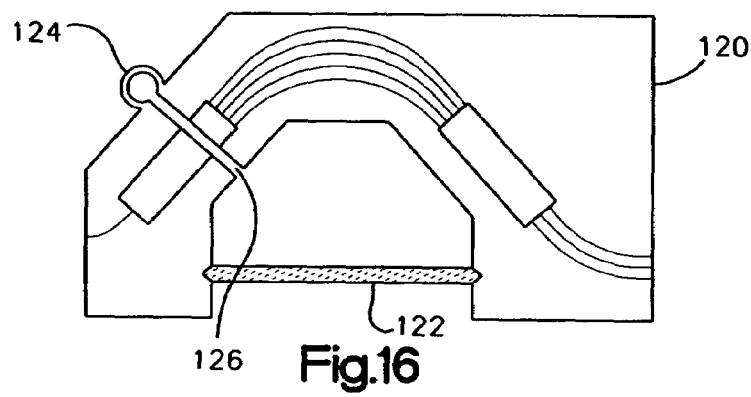
FIG. 16 is a schematic top plan view of another OIC in accordance with one aspect of the present invention.

Referring to FIG. 16, another embodiment of an AWG chip 120 is shown having a substrate, an input waveguide, a first lens, a second lens, a waveguide grating between the two lenses containing a plurality of waveguides, and output waveguides. An actuator 122 connects two regions of the chip, divided by a groove 126. The AWG chip 120 contains a hinge 124. The substrate, actuator 122, and waveguides can be made of any of the materials for these features described in connection with FIGS. 2 and 3.

The gap or groove 126 is formed in the AWG chip 120 traversing one or more of the lenses. The groove 126 goes all the way through the AWG chip 120 vertically. The groove 126 is formed in any suitable manner including using a dicing saw, water jet cutting, chemical etching, laser-wafer-cutter, wire-saw, EDM, and the like. In this embodiment, chemical etching such as reactive ion etching (RIE) is preferred. Although not shown, the groove 126 may traverse the waveguide grating instead of the lens, and the hinge 124 would be positioned visually above the waveguide grating.

Within the gap or groove 126, a waveplate (not shown), such as a half waveplate, may be optionally formed, particularly when the groove traverses the waveguide grating. Additionally or alternatively, the gap or groove 126 may filled with an adhesive, gel, polymer or liquid having an index of refraction that substantially matches that of the lens. Still alternatively, the interior facing edges of the AWG chip 120 (in the groove 126) can be coated with an antireflection film and remain exposed to air.

As the temperature of the structure changes, the actuator 122 changes length at a different rate than the substrate of the AWG chip 120, due to differences in the coefficients of thermal expansion. This causes a change in the angle between the two regions of the AWG (on either side of the groove 126), in particular between two regions of the lens traversed by the groove 126, and deflection of part of the lens and the input (our output) waveguide to move the waveguide relative to the focus point of the light, thus shifting which wavelengths are focused into the waveguide grating, and thus causes a shift in the CW of the device. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

Figure 17:
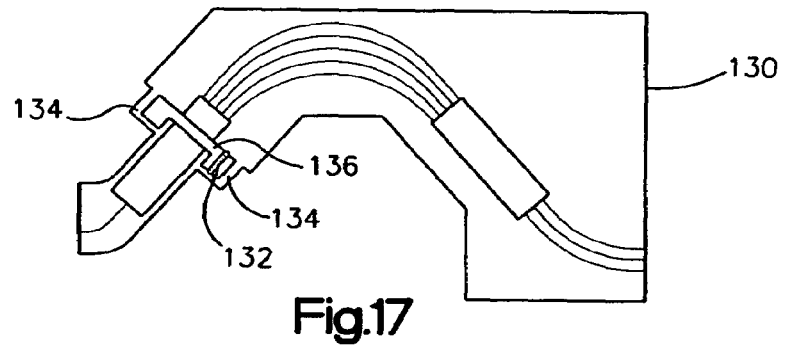
FIG. 17 is a schematic top plan view of yet another OIC in accordance with one aspect of the present invention.

Referring to FIG. 17, yet another embodiment of an AWG chip 130 is shown having a substrate, an input waveguide, a first lens, a second lens, a waveguide grating between the two lenses containing a plurality of waveguides, and output waveguides. An actuator 132 connects two regions of the chip, divided by a groove 136. The AWG chip 130 contains two hinges 134. The substrate, actuator 132, and waveguides can be made of any of the materials for these features described in connection with FIGS. 2 and 3.

The gap or groove 136 is formed in the AWG chip 130 traversing one or more of the lenses. The groove 136 goes all the way through the AWG chip 130 vertically. The groove 136 is formed in any suitable manner including using a dicing saw, water jet cutting, chemical etching, laser-wafer-cutter, wire-saw, EDM, and the like. In this embodiment, chemical etching such as reactive ion etching (RIE) is preferred. Although not shown, the groove 136 may traverse the waveguide grating instead of the lens, and the hinges 134 would be positioned visually above and below the waveguide grating.

Within the gap or groove 136, a waveplate (not shown), such as a half waveplate, may be optionally formed, particularly when the groove traverses the waveguide grating. Additionally or alternatively, the gap or groove 136 may filled with an adhesive, gel, polymer or liquid having an index of refraction that substantially matches that of the lens. Still alternatively, the interior facing edges of the AWG chip 130 (in the groove 136) can be coated with an antireflection film and remain exposed to air.

As the temperature of the structure changes, the actuator 132 changes length at a different rate than the substrate of the AWG chip 130, due to differences in the coefficients of thermal expansion. This causes a change in the angle between the two regions of the AWG (on either side of the groove 136), in particular between two regions of the lens traversed by the groove 136, and deflection of part of the lens and the input (our output) waveguide to move the waveguide relative to the focus point of the light, thus shifting which wavelengths are focused into the waveguide grating, and thus causes a shift in the CW of the device. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

Figure 18:
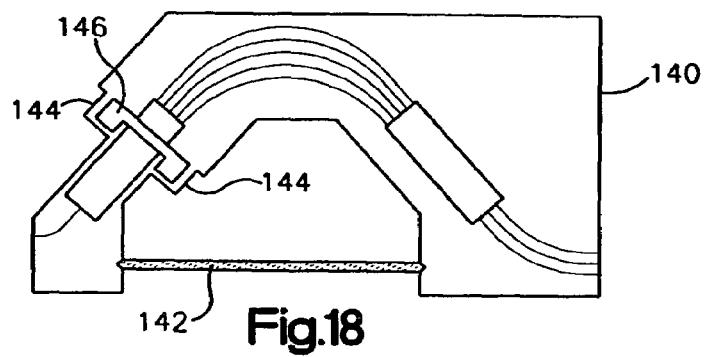
FIG. 18 is a schematic top plan view of still yet another OIC in accordance with one aspect of the present invention.

Referring to FIG. 18, yet another embodiment of an AWG chip 140 is shown having a substrate, an input waveguide, a first lens, a second lens, a waveguide grating between the two lenses containing a plurality of waveguides, and output waveguides. An actuator 142 connects two regions of the chip, divided by a groove 146. The AWG chip 140 contains two hinges 144. The substrate, actuator 142, and waveguides can be made of any of the materials for these features described in connection with FIGS. 2 and 3.

The gap or groove 146 is formed in the AWG chip 140 traversing one or more of the lenses. The groove 146 goes all the way through the AWG chip 130 vertically. The groove 146 is formed in any suitable manner including using a dicing saw, water jet cutting, chemical etching, laser-wafer-cutter, wire-saw, EDM, and the like. In this embodiment, chemical etching such as reactive ion etching (RIE) is preferred. Although not shown, the groove 146 may traverse the waveguide grating instead of the lens, and the hinges 144 would be positioned visually above and below the waveguide grating.

Within the gap or groove 146, a waveplate (not shown), such as a half waveplate, may be optionally formed, particularly when the groove traverses the waveguide grating. Additionally or alternatively, the gap or groove 136 may filled with an adhesive, gel, polymer or liquid having an index of refraction that substantially matches that of the lens. Still alternatively, the interior facing edges of the AWG chip 140 (in the groove 146) can be coated with an antireflection film and remain exposed to air.

As the temperature of the structure changes, the actuator 142 changes length at a different rate than the substrate of the AWG chip 140, due to differences in the coefficients of thermal expansion. This causes a change in the angle between the two regions of the AWG (on either side of the groove 146), in particular between two regions of the lens traversed by the groove 146, and deflection of part of the lens and the input (our output) waveguide to move the waveguide relative to the focus point of the light thus shifting which wavelengths are focused into the waveguide grating, and thus causes a shift in the CW of the device. The actuator and base material size and shape are chosen such that the CW shift caused by the thermal expansion/contraction of the actuator exactly balances the CW shift in the AWG due to change in temperature. As a result, the AWG CW is independent of temperature. The amount of pre-bias put on the actuator also can be tuned to tune in the correct CW for the AWG.

In some embodiments of FIGS. 15 to 18, when a polymer occupies the groove traversing a lens or waveguide grating (or between a mirror and an AWG chip), if the polymer has a desired coefficient of thermal expansion, that is different from the coefficient of thermal expansion of the AWG chip 110 substrate, the polymer may function as an actuator.

Figure 19:
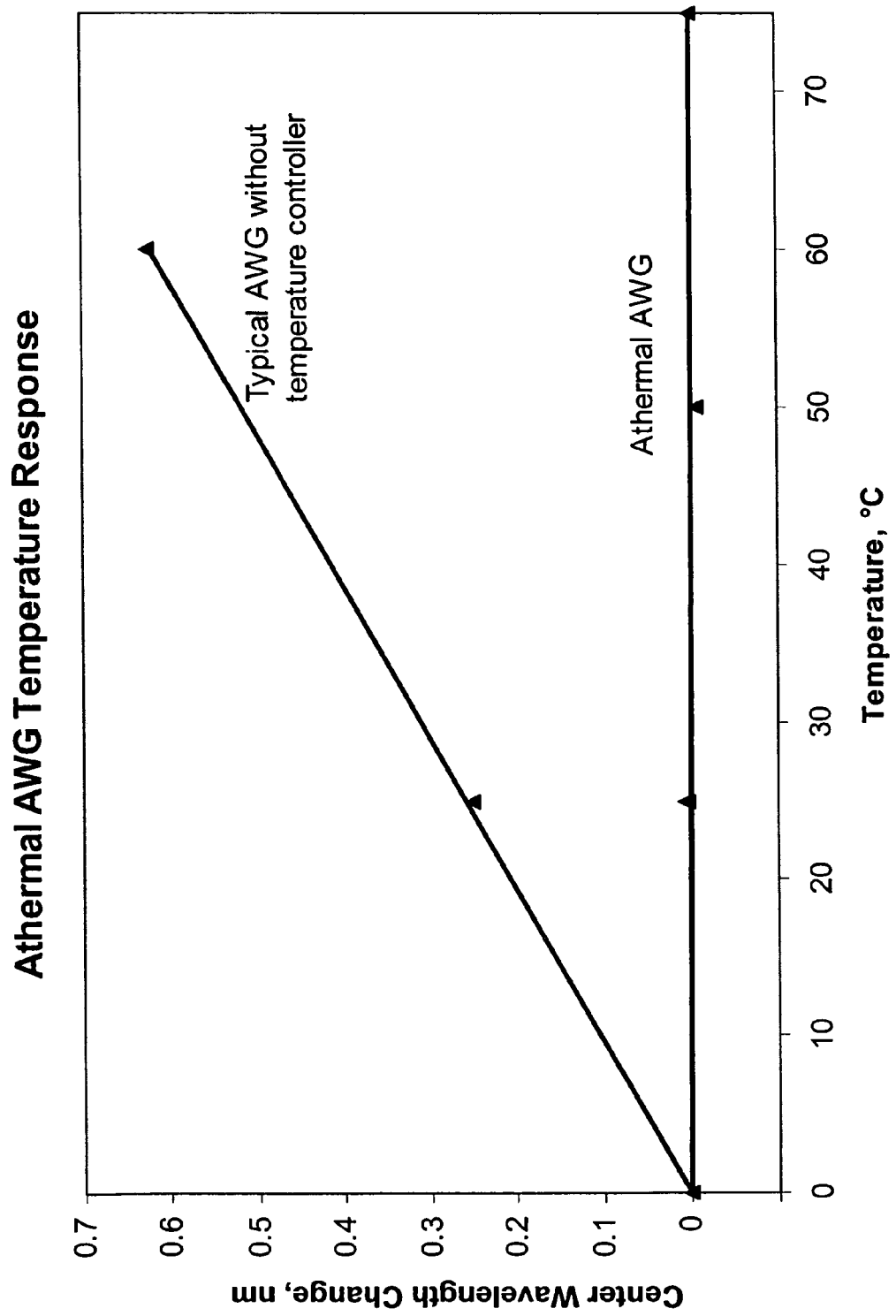
FIG. 19 is a graph plotting change in CW (y axis) versus change in temperature (x axis) for a conventional AWG that is not temperature stabilized and an AWG in accordance with one aspect of the present invention.

Referring to FIG. 19, a graph showing the different CW changes/responses to temperature for a conventional AWG that is not temperature stabilized and an athermal AWG made in accordance with the present invention. As the graph indicates, as the temperature increases, the CW of the conventional AWG increasingly changes. On the contrary, as the temperature increases, the CW of the athermal AWG made in accordance with the present invention remains substantially constant.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "with", "has", "having", and variants thereof are used in either the detailed description or the claims, these terms are intended to be inclusive in a manner similar to the term "comprising."

What is claimed is:

1. An athermalized optical integrated circuit, comprising:
a base consisting essentially of one piece and having a first thermal expansion coefficient, the base comprising a first region, a second region, and a hinge region, the first region and the second region separated by the hinge region;
an arrayed waveguide chip supported by the base, the arrayed waveguide chip comprising a substrate, a lens, a waveguide grating optically coupled to the lens, and a groove traversing one of the lens and the waveguide grating; and
an actuator having a second thermal expansion coefficient, the actuator connecting the first region and the second region of the base, the actuator operative to move the first region of the base relative to the second region of the base in response to a temperature change, wherein the second thermal expansion coefficient is different from the first thermal expansion coefficient.

2. The athermalized optical integrated circuit of claim 1, wherein the second thermal expansion coefficient is less than the first thermal expansion coefficient.

3. The athermalized optical integrated circuit of claim 1, wherein the second thermal expansion coefficient is greater than the first thermal expansion coefficient.

4. The athermalized optical integrated circuit of claim 1, wherein the actuator is one of a piezoelectric element, an electrostrictive actuator, a solenoid, and an electric motor.

5. The athermalized optical integrated circuit of claim 1, wherein the groove traverses the waveguide grating.

6. The athermalized optical integrated circuit of claim 5, wherein the groove comprises a waveplate.

7. The athermalized optical integrated circuit of claim 1, wherein the groove traverses the lens.

8. The athermalized optical integrated circuit of claim 1, wherein the groove has a width is about 1 micron or more and about 50 microns or less.

9. The athermalized optical integrated circuit of claim 1, wherein the groove completely traverses the arrayed waveguide chip thereby forming a first piece of the arrayed waveguide chip and a second piece of the arrayed waveguide chip, the first piece of the arrayed waveguide chip supported by the first region of the base and the second piece of the arrayed waveguide chip supported by the second region.

10. The athermalized optical integrated circuit of claim 1, wherein the arrayed waveguide chip comprises at least one input waveguide optically coupled to a first lens, at least one output waveguide optically coupled to a second lens, the waveguide grating optically coupled to the first lens and the second lens, and the groove traverses one of the first lens, the second lens, and the waveguide grating.

11. The athermalized optical integrated circuit of claim 1, wherein the arrayed waveguide chip further comprises a mirror, and the groove traverses a space between the mirror and one of the lens and the waveguide grating.

12. An athermalized optical integrated circuit, comprising:
an arrayed waveguide chip comprising a substrate consisting essentially of one piece and, a lens, a waveguide grating optically coupled to the lens, and a groove traversing one of the lens and the waveguide grating, the substrate having a first thermal expansion coefficient, the substrate of the arrayed waveguide chip comprising a first region, a second region, and a hinge region, the first region and the second region separated by the hinge region;
an actuator having a second thermal expansion coefficient, the actuator connecting the first region and the second region of the arrayed waveguide chip, the actuator operative to rotate the first region of the arrayed waveguide chip about the second region of the arrayed waveguide chip in response to a temperature change; and
the arrayed waveguide chip being positioned over a base having a third thermal expansion coefficient, the base comprising a first region and a second region separated by a hinge,
wherein the second thermal expansion coefficient is different from the first thermal expansion coefficient.

13. The athermalized optical integrated circuit of claim 12, wherein the difference between the second thermal expansion coefficient and the first thermal expansion coefficient is at least 100%.

14. The athermalized optical integrated circuit of claim 12, wherein the groove has a width is about 3 microns or more and about 30 microns or less.

15. The athermalized optical integrated circuit of claim 12, wherein the arrayed waveguide chip comprises at least one input waveguide optically coupled to a first lens, at least one output waveguide optically coupled to a second lens, the waveguide grating optically coupled to the first lens and the second lens, and the groove traverses one of the first lens, the second lens, and the waveguide grating.

16. The athermalized optical integrated circuit of claim 12, wherein the second thermal expansion coefficient is less than the first thermal expansion coefficient.

17. A method of making an athermalized optical integrated circuit, comprising:
providing a base consisting essentially of one piece and having a first thermal expansion coefficient, the base shaped to comprise a first region, a second region, and a hinge region, the first region and the second region separated by the hinge region;
attaching an arrayed waveguide chip to the base, the arrayed waveguide chip comprising a substrate, a lens, and a waveguide grating optically coupled to the lens;
forming a groove in the arrayed waveguide chip, the groove traversing one of the lens and the waveguide grating; and
attaching an actuator having a second thermal expansion coefficient to the base, the actuator connecting the first region and the second region of the base, wherein the second thermal expansion coefficient is different from the first thermal expansion coefficient, the actuator operative to rotate the first region of the base about the second region of the base in response to a temperature change.

18. The method of claim 17, wherein forming the groove comprises one of a dicing saw, a water jet cutter, chemical etching, a laser-wafer-cutter, and a wire-saw.

19. A method of making an athermalized optical integrated circuit, comprising:
providing an arrayed waveguide chip, the arrayed waveguide chip comprising a substrate consisting essentially of one piece, a lens, and a waveguide grating optically coupled to the lens, the substrate having a first thermal expansion coefficient;
shaping the substrate of the arrayed waveguide chip to comprise a first region and a second region separated by a groove and connected by a hinge region, the substrate remaining in one piece; and
attaching an actuator having a second thermal expansion coefficient to the arrayed waveguide chip, the actuator connecting the first region and the second region of the arrayed waveguide chip, wherein the second thermal expansion coefficient is different from the first thermal expansion coefficient, the groove traversing one of the lens and the waveguide grating, the actuator operative to move the first region of the arrayed waveguide chip relative to the second region of the arrayed waveguide chip in response to a temperature change.

20. The method of claim 19, wherein forming the groove comprises one of a dicing saw, a water jet cutter, chemical etching, a laser-wafer-cutter, and a wire-saw.

21. An athermalized optical integrated circuit, comprising:
  a base having a first thermal expansion coefficient, the base comprising a first region and a second region separated by a hinge;
  an arrayed waveguide chip over the base, the arrayed waveguide chip comprising a lens, a waveguide grating optically coupled to the lens, and a groove traversing one of the lens and the waveguide grating, one of the lens and the waveguide grating is positioned directly above the hinge of the base; and
  an actuator having a second thermal expansion coefficient, the actuator connecting the first region and the second region of the base, the actuator operative to move the first region of the base relative to the second region of the base in response to a temperature change, wherein the second thermal expansion coefficient is different from the first thermal expansion coefficient.

22. An athermalized optical integrated circuit, comprising:
  a base having a first thermal expansion coefficient, the base comprising a first region and a second region separated by a hinge;
  an arrayed waveguide chip over the base, the arrayed waveguide chip comprising a lens, a waveguide grating optically coupled to the lens, and a groove traversing one of the lens and the waveguide grating, the groove is positioned directly above the hinge of the base; and
  an actuator having a second thermal expansion coefficient, the actuator connecting the first region and the second region of the base, the actuator operative to move the first region of the base relative to the second region of the base in response to a temperature change, wherein the second thermal expansion coefficient is different from the first thermal expansion coefficient.

* * * * *